May 26, 1959
JOHN PHIL FELLABAUM
NOW BY JUDICIAL CHANGE OF NAME
JOHN PHIL FELBURN
WHEEL SUSPENSIONS FOR TRAILERS
2,888,268
Filed April 23, 1956
4 Sheets-Sheet 1
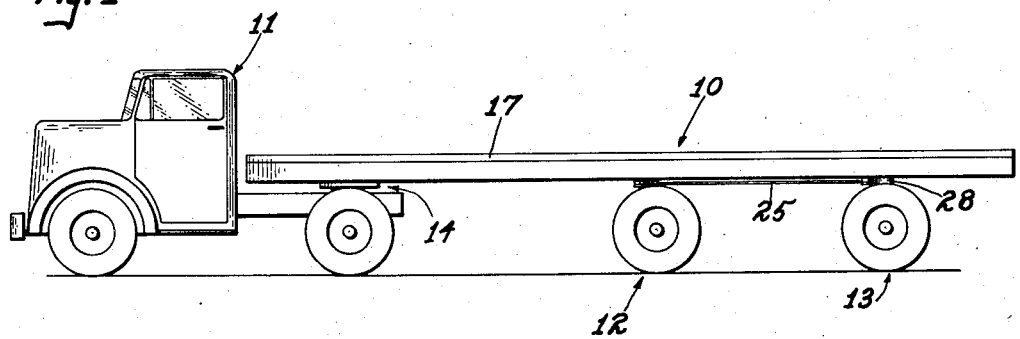
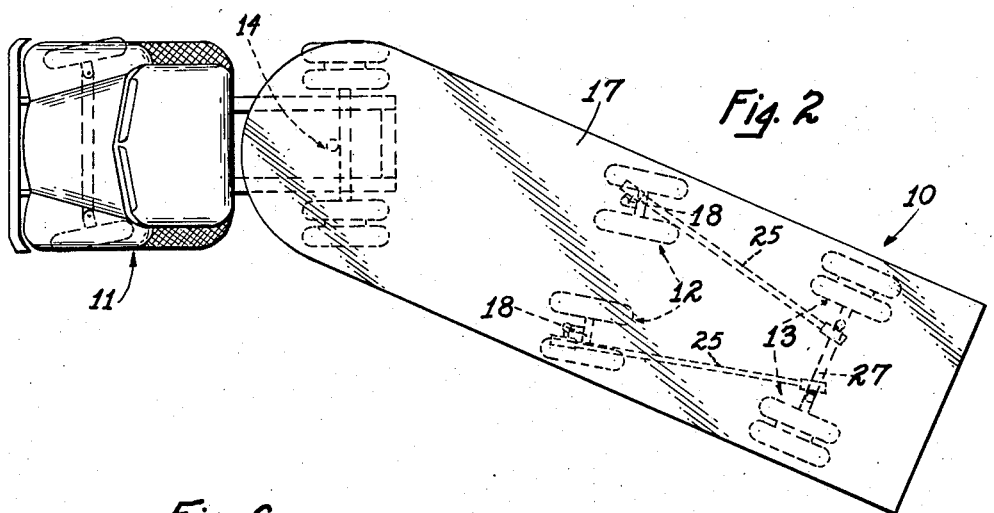
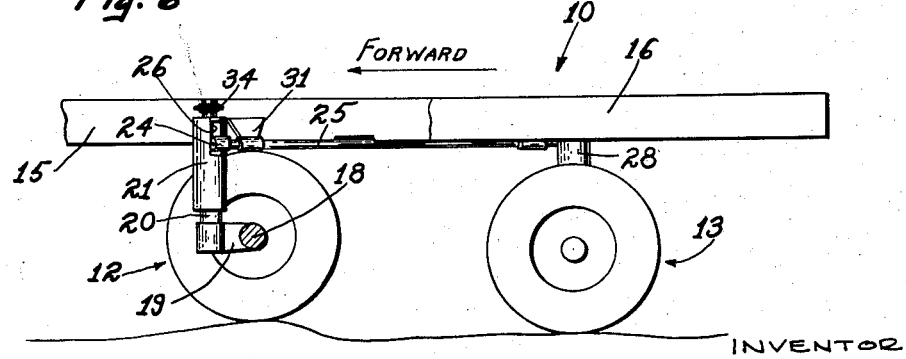
INVENTOR
J. P. FELLABAUM, NOW BY
JUDICIAL CHANGE OF NAME
J. P. FELBURN
BY
ATTORNEY May 26, 1959
JOHN PHIL FELLABAUM
NOW BY JUDICIAL CHANGE OF NAME
JOHN PHIL FELBURN
WHEEL SUSPENSIONS FOR TRAILERS
2,888,268
Filed April 23, 1956
4 Sheets—Sheet 2
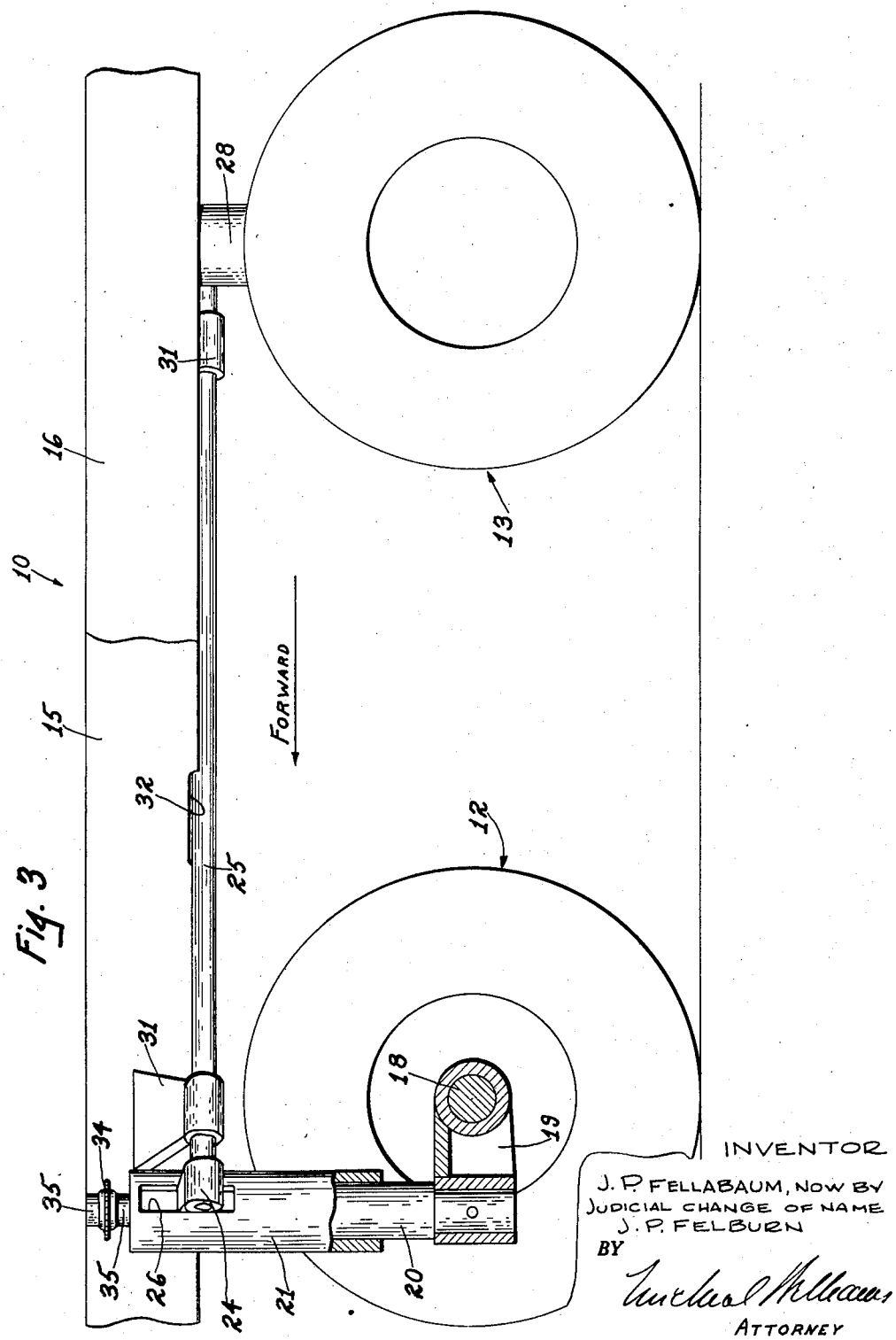
INVENTOR
J. P. FELLABAUM, NOW BY
JUDICIAL CHANGE OF NAME
J. P. FELBURN
BY
ATTORNEY

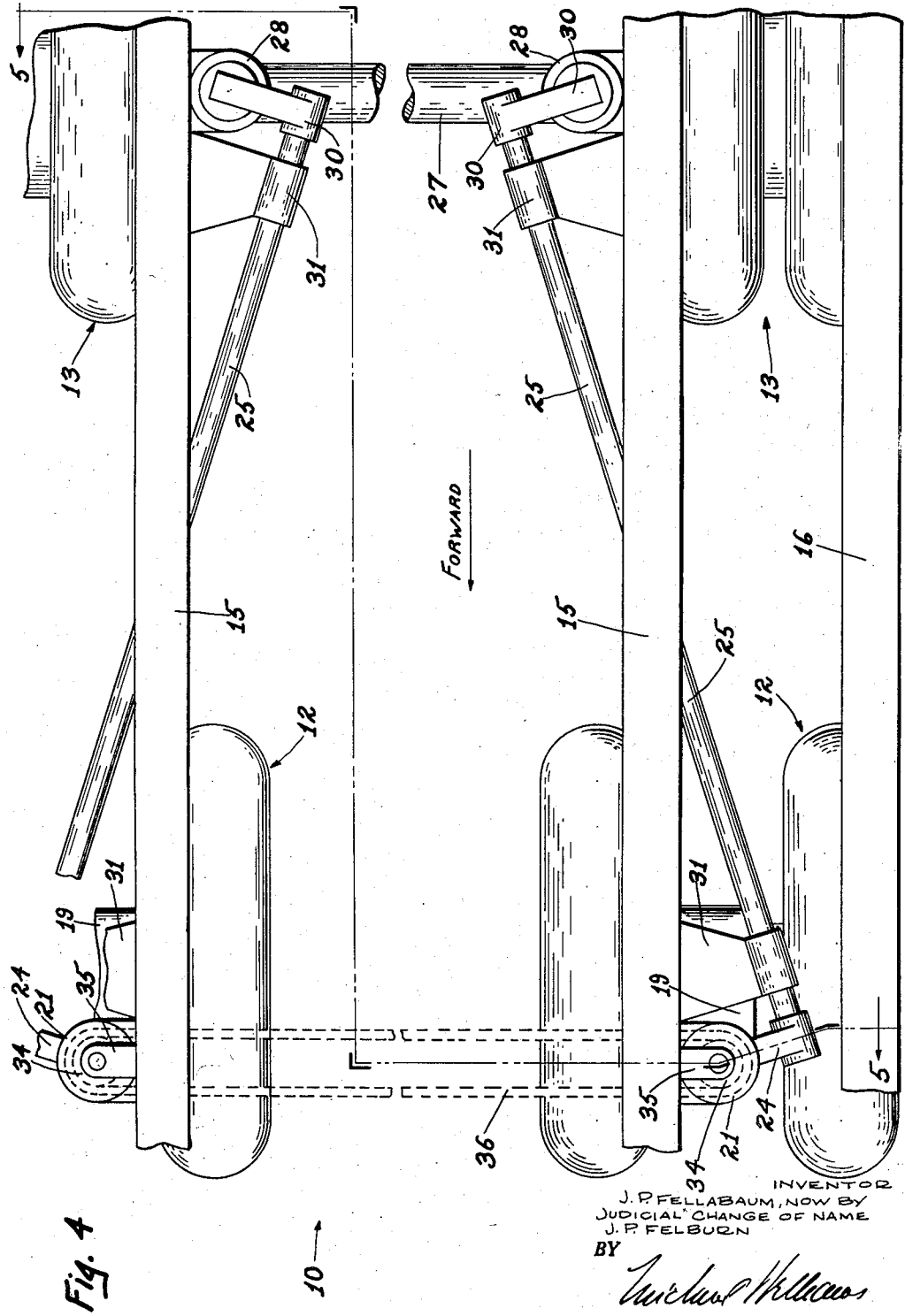

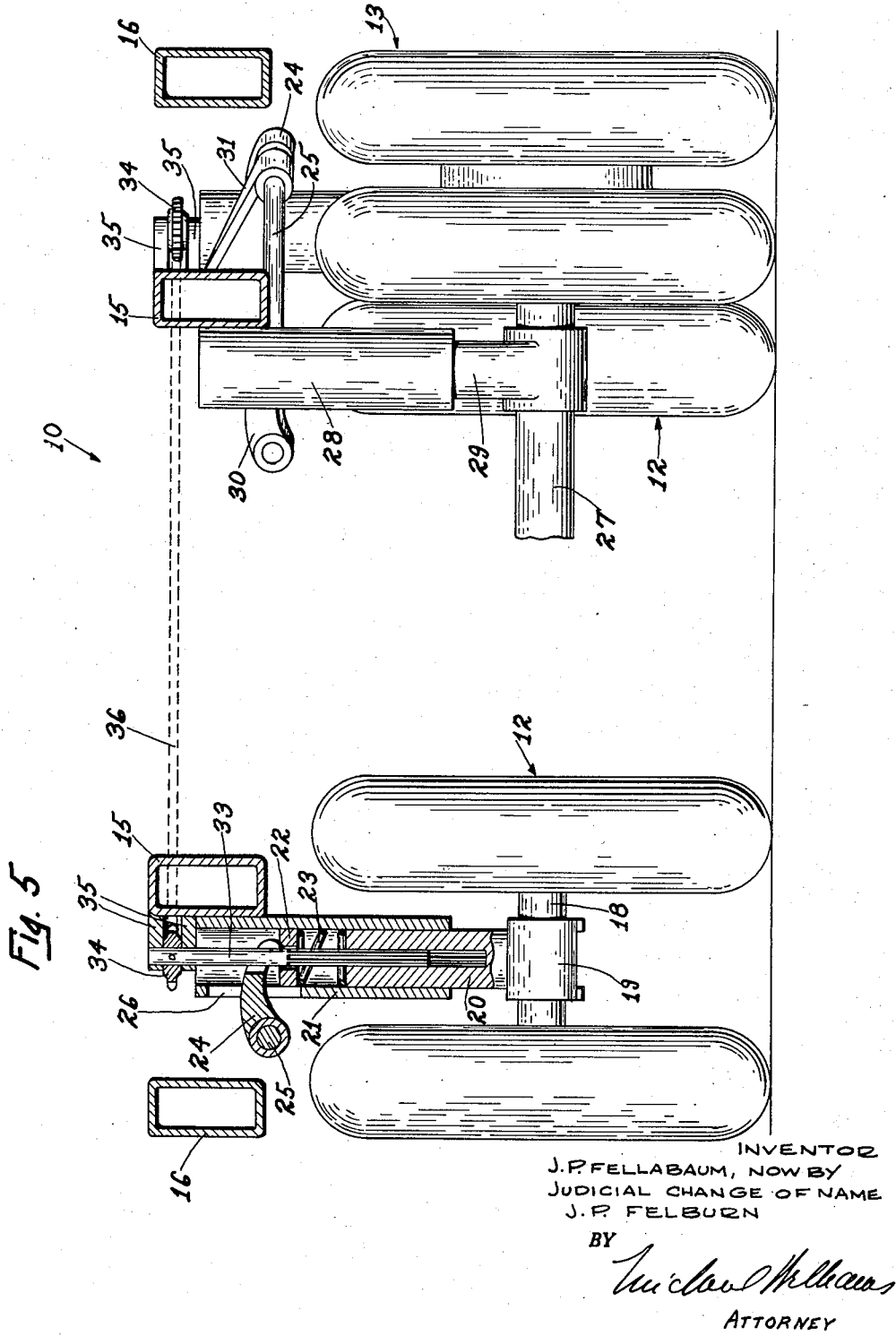

United States Patent Office 2,888,268
Patented May 26, 1959

2,888,268

WHEEL SUSPENSIONS FOR TRAILERS

John Phil Fellabaum, Dayton, Ohio; now by judicial change of name John Phil Felburn Application April 23, 1956, Serial No. 580,025

9 Claims. (Cl. 280—104.5)

The present invention relates to trailers of the type known as semi-trailers which have one end supported by road wheels and the other end supported by a towing vehicle, and the principal object of the invention is to provide new and improved trailers of such character.

In order to protect highways against damage from heavily loaded vehicles, most states have enacted laws which limit the maximum amount of weight which any one axle of the vehicle may bear. This has led to the use of trailers having multiple axles so as to divide the load therebetween. Recognizing the closely spaced axles tend to concentrate stress upon a relatively small segment of the road, many states further reduce the allowable weight per axle below the maximum limit unless such axles are spaced apart longitudinally a certain minimum amount.

In order to take full advantage of maximum weight limits, many trailer constructions having a pair of widely spaced axles have been proposed. Certain of these constructions have met with a fair amount of success; however, most, if not all, have had one or more serious drawbacks which drastically limited their wide-spread usage.

The simplest and cheapest construction has been provided merely by moving the usual closely spaced tandem axles of a semi-trailer apart. This construction has not been satisfactory because of very severe tire wear due to the fact that with conventional tandem axle constructions, the trailer wheels are actually dragged sideways on turns or curves. This drag on the wheels is greatly exaggerated when the usual closely spaced axles are merely moved apart. Under certain circumstances this tire drag is so severe that the trailer exerts a powerful braking effect which must, of course, be overcome by the towing vehicle. Further, a trailer of this type is particularly dangerous on slipper roads since there is a much greater tendency for it to skid out of control on a curve because of the fact that the wheels are not turning freely but are skidding sideways.

It has been proposed that certain wheels of the trailer, usually the forward set of wheels, be pivotally mounted so that they will align themselves with the direction of trailer movement and thus eliminate the greatest disadvantage of the previously mentioned skidder type construction. However, most of these proposed constructions proved to have serious disadvantages of their own. Many were satisfactory from a standpoint of tire wear; however, they were difficult, if not impossible, to maneuver in backing. Further, in many of these constructions, there was inadequate springing and/or equalizing between wheels.

The present invention provides a trailer which possesses none of the above mentioned disadvantages or prior art trailers. Other objects and advantages reside in the construction of parts, the combination thereof, the method of manufacture and the mode of operation, as will become more apparent from the following description.

In the drawings accompanying this specification and forming a part of this application there is shown, for purpose of illustration, an embodiment which the invention may assume, and in these drawings:

Figure 1 is a side elevational view of a semi-trailer, constructed in accordance with the present invention, attached in the usual manner to a suitable towing vehicle, Figure 2 is a top play view similar to Figure 1 but of showing the trailer and towing vehicle negotiating a curve, Figure 3 is an enlarged, fragmentary side elevational view of the trailer, certain parts being removed to better illustrate the underlying structure.

Figure 4 is a fragmentary, top plan view of the structure shown in Figure 3,

Figure 5 is a sectional view generally corresponding to the line 5—5 of Figure 4, and Figure 6 is a reduced side view, similar to Figure 3, but showing the trailer passing over an obstruction in the roadway.

As best shown in Figure 1, the trailer 10 herein disclosed is of the type whose front portion is adapted to be supported by a towing vehicle, or tractor 11, and whose rear portion is supported by longitudinally spaced sets of road wheels 12 and 13. The connection 14 between the tractor and the trailer is the usual fifth wheel construction which provides a vertical pivot about which the respective longitudinal axes of the tractor and trailer are relatively displaceable.

Trailer 10 comprises a plurality of longitudinally extending frame members herein shown to be four in number (see Figure 5) and including a pair of inner frame members 15 and outer frame members 16. As shown in Figures 1 and 2, a suitable load bearing floor 17 overlies the frame members and the latter are suitably connected together by transverse frame members (not shown). In a manner to be disclosed, wheel sets 12 and 13 are connected to the trailer frame for movement toward and away therefrom.

The rear set of wheels 13 are conventional in that the wheels on opposite sides of the longitudinal axis of the trailer are connected by the usual axle. However, it is an important feature of the invention that for easier handling and greater stability on rough roads, the wheels of the front wheel set 12 on opposite sides of the trailer's longitudinal axis are independent of each other so that those on one side may move vertically toward and away from the trailer frame without affecting those on the other side. It is a further important feature of the invention that the forward set of wheels 12 are supported for castering action so that such wheels will align with the direction of trailer movement to eliminate tire drag and resultant rapid tire wear.

Since the trailer herein shown is adapted to carry heavy loads, all of the wheels are arranged in pairs as will appear. Front wheel set 12 comprises a pair of closely spaced wheels, each pair being disposed on opposite sides of the trailer's longitudinal axis. Since each pair of wheels of wheel set 12 are mounted in the same manner, only one pair will be disclosed in detail.

As best seen in Figures 3 and 5, the closely spaced wheels of each pair of wheels of wheel set 12 are connected together by means of an axle 18. One end of an arm or wheel carrying member 19 is secured to axle 18 intermediate the wheels and the other end of the arm is secured to an upstanding pin 20 which is both slidably and rotatably contained within an upright tubular housing or frame extension 21. Housing 21 is secured to a respective adjoining frame member 15 by welding or the like. Each set of wheels 12, together with the axle 18, the arm 19 and the pin 20, may be referred to as "bogie" wheels.

While the connection between axle 18 and pin 20 is shown to be solid so as to preclude tilting of the wheels carried by the axle, if it is desirable to permit the wheels to tilt as they pass over the road irregularities, such action could easily be provided by interposing a resilient sleeve between arm 19 and axle 18 or by providing a horizontal pivot between the pin and the axle.

As shown in Figure 5, a disc-like member 22 is slidably positioned in tubular housing 21 above pin 20 and resilient means such as a suitable coil spring 23 is interposed between the disc-like member and the upper end of the pin. Engaged with the top of member 22 is one end of an arm 24 whose other end is secured to a torsion rod 25. The end of arm 24 engaged with member 22 is bifurcated for a purpose to be disclosed and the housing is slotted at 26 to pass such arm.

With particular reference to Figures 4 and 5, the rear set of wheels 13 comprises a pair of closely spaced wheels positioned on each side of the trailer's longitudinal axis and carried by an axle 27. This axle is supported in a manner similar to that heretofore described; that is, upright tubular housings 28 are welded or otherwise secured to respective frame members 15 and such housings have pins 29 which project from the lower ends thereof and which are suitably connected to axle 27. If desired, the connection between pins 29 and axle 27 may be such as to provide for tilting of the axle and may include resilient bushings or the like interposed therebetween for such purpose. Pins 29 are slidable vertically in their respective housings 28 and the remaining construction of the latter is preferably similar to that thus far disclosed with respect to housing 21 with the exception that arms 30, which project through slots in housings 28 and which are secured to rods 25, need not be bifurcated as are arms 24.

As previously mentioned, arm 24 is secured to a torsion rod 25 and the latter is pivotally secured to frame member 15 by means of suitable brackets 31. Rod 25 extends rearwardly from housing 21 to housing 28 and is so disposed that respective arms 24, 30 carried thereby extend in opposite directions for a purpose to become clear. Note that frame member 15 is relieved at 32 (see Figure 3) to clear rod 25.

In the construction thus far described, when the wheels of set 12 on one side of the trailer strike an obstruction in the road, as is illustrated in Figure 6, these wheels will be forced upwardly. Pin 20 will slide up in housing 21 and part of this movement will be absorbed by spring 23 and part will be transferred to upward movement of member 22. When member 22 moves upwardly, it will rotate arm 24 which will in turn rotate torsion rod 25 which will absorb some movement by torsional deflection and transfer the remainder to arm 30. Rotation of arm 30 will compress the spring within housing 28 and force the wheels of set 13 on this side of the trailer down. Accordingly, upward movement of the front wheels on one side of the trailer will be transferred to downward movement of the rear wheels on the same side. However, this movement will be cushioned by the respective coil springs within the housings and by the torsion rod. It will be obvious that movement in the opposite direction will be transmitted in a similar manner.

As best shown in Figure 3, since axle 18 is carried by pin 20 in off-set relation, the wheels carried by this axle have a castering action and pivot about the axis of housing 21 to align with the direction of trailer movement. Since each pair of wheels of wheel set 12 can rotate completely around the axes of their respective housings, maneuvering with this trailer is no more difficult than with one having but a single fixed axle since the wheels of wheel set 12 will at all times align themselves with trailer movement.

The construction thus far disclosed operates satisfactorily; however, since caster mounted wheels have a tendency to oscillate about their pivots, it is preferable to connect the wheels of wheel set 12 on one side of the trailer with the wheels of such set on the other side of the trailer so that they rotate in unison about their respective pivots.

My invention is preferably adapted for use with trailers having conventional wheel and tire size. Regulations define road widths which a trailer may legally occupy and therefore the spacing of the wheels widthwise of the trailer is restricted. Accordingly, the connection between the wheels, as above mentioned, is of considerable importance. Without such connection opposite wheels under certain conditions of travel may turn inward toward each other and, because of their size and their limited spacing, may interlock or jam with undesirable results. Further, without the connection above mentioned, the wheels under certain conditions of travel may turn outward away from each other and thus exceed the legal width prescribed by regulations.

With reference to Figure 5, a shaft 33 is centrally positioned within housing 21 and to its upper end is secured a sprocket 34 which is flanked by brackets 35 in which the shaft is rotatable. Shaft 33 passes between the furcations of arm 24 and through an aperture in disc-like member 22 and its lower end has splined connection with pin 20. This splined connection permits pin 20 to move vertically relative to shaft 33; however, when pin 20 rotates within the housing, shaft 33 will rotate therewith. A chain 36 passes through suitable apertures in frame members 15 and connects sprocket 34 of the wheels on one side with sprocket 34 of the wheels on the other side to thus tie them together for unitary rotation about respective axes for the purpose aforesaid.

Within the purview of this invention, any suitable cushioning mechanism could be used instead of the springs 23. For example, an inflated hollow bladder could be substituted for the springs 23. Instead of using springs in the tubular housing 21, torsion springs could be used to connect the arm 24 to the torsion bar 25. Instead of the arms 24 and the torsion bar 25, a comparatively stiff leaf spring, pivotally attached at the center to the frame member 15 and the ends resting on top of the pins 20, could be used to transfer the shock from the front wheels to the rear wheels, or vice versa. A hydraulic mechanism could also be used, wherein the portion of the hollow tube above the pins 20 could be constructed as a sealed compartment connected to a like tubular member on the same side of the vehicle by a pipe communicating with a chamber having compressed air, functioning as a cushioning member.

In view of the foregoing it will be apparent to those skilled in the art that I have accomplished at least the principal object of my invention and it will also be apparent to those skilled in the art that the embodiment herein described may be variously changed and modified, without departing from the spirit of the invention, and that the invention is capable of uses and has advantages not herein specifically described, hence it will be appreciated that the herein disclosed embodiment is illustrative only and that my invention is not limited thereto

I claim:

1. A trailer of the type having one end supported by road engaging wheels and having another end adapted to be pivotally supported by a towing vehicle, comprising a trailer frame, two sets of road wheels carried by said frame for movement toward and away therefrom, each set having a wheel disposed on opposite sides of the longitudinal axis of said trailer and said sets being spaced apart longitudinally thereof, a wheel of one of said wheel sets disposed on one side of said trailer's longitudinal axis being vertically movable independently of the other wheel of said set disposed on the opposite side of said trailer axis, means providing generally vertical axes disposed adjacent respective wheels of said one wheel set, the rotational axis of each wheel of said one wheel set being offset to one side of its respective adjoining vertical axis and each being pivotable about its vertical axis in response to side thrust to align with the direction of trailer movement and reduce scuffing of said one set of wheels, a sprocket connected to respective wheels of said one set and each rotatable with its wheel about the latter's respective vertical axis, chain means connecting said sprockets together for simultaneous rotation so that said wheels mutually stabilize each other to minimize rapid oscillation of said wheels about respective vertical axes, and means for transmitting vertical movement in one direction of one of the wheels of said one set to vertical movement in the opposite direction of the corresponding wheel of said other set, said means providing a resilient lost motion connection therebetween for absorbing road shock.

2. A trailer of the type having one end supported by road engaging wheels and having another end adapted to be pivotally supported by a towing vehicle, comprising a trailer frame, two sets of road wheels carried by said frame for movement toward and away therefrom, each set having a wheel disposed on opposite sides of the longitudinal axis of said trailer and said sets being spaced apart longitudinally thereof, a wheel of one of said wheel sets disposed on one side of said trailer's longitudinal axis being vertically movable independently of the other wheel of said set disposed on the opposite side of said trailer axis, means providing generally vertical axes disposed adjacent respective wheels of said one wheel set, the rotational axis of each wheel of said one wheel set being offset to one side of its respective adjoining vertical axis and each being pivotable about its vertical axis in response to side thrust to align with the direction of trailer movement and reduce scuffing of said one set of wheels, a bar rotatably carried by said frame and extending between the wheels of respective wheel sets disposed on the same side of the longitudinal axis of said trailer for transmitting vertical movement in one direction of one of said wheels to vertical movement in the opposite direction of said other wheel, said bar having spaced portions so connected to said wheels that the latter, upon being urged in the same vertical direction, tend to rotate such spaced bar portions in opposite directions to place said bar under torsional stress, and resilient means interposed between each of said wheels and said connecting bar providing yieldable cushions for absorbing wheel movement.

3. A trailer of the type having one end supported by road engaging wheels and having another end adapted to be pivotally supported by a towing vehicle, comprising a trailer frame, two sets of road wheels carried by said frame for movement toward and away therefrom, each set having a wheel disposed on opposite sides of the longitudinal axis of said trailer and said sets being spaced apart longitudinally thereof, means providing generally vertical axes disposed adjacent respective wheels of said one wheel set and each vertical axis being off-set radially of the rotational axis of a respective adjoining wheel of said one wheel set and each vertical axis being so disposed with respect to its wheel that each rotational wheel axis swings in an arc about its vertical axis in response to trailer movement to automatically position such rotational wheel axis rearwardly of its vertical axis with respect to the direction of trailer movement and at right angles thereto to provide for free rolling movement of the wheels of said one wheel set without side scuffing, a sprocket connected to respective wheels of said one set and each being rotatable with its wheel about the latter's respective vertical axis, chain means connecting said sprockets together for simultaneous rotation so that said wheels mutually stabilize each other to mnimize rapid oscillation of said wheels about respective vertical axes, and means for transmitting vertical movement in one direction of one of the wheels of said one set to vertical movement in the opposite direction of the corresponding wheel of said other set.

4. A trailer of the type having one end supported by road engaging wheels and having its other end adapted to be pivotally supported by a towing vehicle, comprising a trailer frame, two sets of road wheels carried by said frame for vertical movement relative thereto and each set having wheels disposed on opposite sides of the longitudinal axis of said trailer and said sets being spaced apart longitudinally thereof, leg means adjacent respective wheels of one of said sets and each having a generally vertically disposed axis and each formed of an inner and outer member, one member of each leg means being secured to said frame and the other member of each leg means being movable relative to its one member both axially of its leg means axis and pivotally thereabout, respective wheels of said one set being secured to said other member of its respective adjoining leg means for simultaneous movement therewith and the rotational axes of such wheels being offset to one side of the axis of respective leg means to provide for vertical movement of the wheels of said one set as irregularities in the road surface are encountered and to provide for pivotal movement of the wheels of said one set in either direction in an unlimited amount about respective leg means axes in response to side thrust thereon to align them with the direction of trailer movement and reduce wheel scuffing, means connecting the wheels of said one wheel set together for simultaneous movement about respective leg means axes so that such wheels mutually stabilize each other to minimize rapid oscillation of such wheels about said axes, and torsion rod means for transmitting vertical movement in one direction of one of the wheels of said one set to vertical movement in the opposite direction of the corresponding wheel of said other set.

5. A wheel suspension for a vehicle comprising two pairs of front and two pairs of rear road-engaging wheels spaced longitudinally of the vehicle frame, said front and rear pairs of wheels being located on opposite sides of the vehicle frame and mounted thereon for vertical movement, a pair of torsion bars carried by and lengthwise of said vehicle frame on opposite sides thereof for rotation each about its axis, said torsion bars extending between said pairs of front and rear wheels on opposite sides of said vehicle frame, members connecting corresponding front and rear wheels with opposite ends of said torsion bars so that upward movement of one of said wheel pairs is transmitted through and transformed by one of said torsion bars to downward movement of the other of said wheel pairs, said connecting members for said front wheel pairs including a wheel carrying member having an upstanding pin thereon slidably connected to a downwardly extending frame extension for relative vertical telescoping movement therebetween.

6. A wheel suspension according to claim 5, having resilient means exerting an expansion bias tending to separate said wheel carrying member and said frame extension for cushioning said frame against road shock.

7. A wheel suspension assembly according to claim 6, wherein said resilient means is disposed between said wheel carrying member and a laterally extending arm of said torsion bar whereby excess compression of said resilient means tends to axially rotate said torsion bar.

8. A wheel suspension for a vehicle, comprising two pairs of front and rear road engaging wheels mounted on horizontal axes in longitudinally spaced relation on a vehicle frame with the wheels of each pair disposed on opposite sides thereof, means mounting said wheel pairs for vertical movement relative to said frame, said mounting means for each front wheel including a wheel carrying member having an upstanding portion thereon slidably connected to a downwardly extending frame extension for relative vertical telescoping movement therebetween, said upstanding portion extending along and disposed for free rotation about a vertical axis, said vertical axis being in non-intersecting relation to the said horizontal axes of said front wheels, a torsion bar rotatably carried on said frame on each side thereof and operatively connected at its opposite ends with front and rear wheels on the same side of said frame for transforming upward movement of a wheel at one end of said bar into downward movement of a wheel at the other end thereof, said operative connection between said torsion bar and a front wheel lying along the said vertical rotational axis of said front wheel.

9. A wheel suspension according to claim 8, wherein said frame extension comprises a sleeve and said upstanding portion of said wheel carrying member comprises a pin slidably and rotatably telescoped in said sleeve.

References Cited in the file of this patent

UNITED STATES PATENTS

| | | |
|---|---|---|
| 1,117,419 | Miller | Nov. 17, 1914 |
| 2,042,780 | Greer | June 2, 1936 |
| 2,150,322 | Garnett et al. | Mar. 14, 1939 |
| 2,269,728 | Mills | Jan. 13, 1942 |
| 2,409,507 | Mettetal | Oct. 15, 1946 |
| 2,435,199 | Buckendale | Feb. 3, 1948 |
| 2,563,261 | Montrose-Oster | Aug. 7, 1951 |
| 2,660,451 | Page | Nov. 24, 1953 |
| 2,698,668 | McKay | Jan. 4, 1955 |
| 2,764,425 | Ronning | Sept. 25, 1956 |